US012581328B2

(12) United States Patent
Desai et al.

(10) Patent No.: US 12,581,328 B2
(45) Date of Patent: Mar. 17, 2026

(54) REQUESTING AN UNSCHEDULED RADIO RESOURCE MANAGEMENT (RRM) OPERATION

(71) Applicant: Cisco Technology, Inc., San Jose, CA (US)

(72) Inventors: Vishal S Desai, San Jose, CA (US); Young Il Choi, San Jose, CA (US); Jim Florwick, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 393 days.

(21) Appl. No.: 18/310,653

(22) Filed: May 2, 2023

(65) Prior Publication Data

US 2024/0373261 A1 Nov. 7, 2024

(51) Int. Cl.
*H04W 16/14* (2009.01)
*H04W 24/04* (2009.01)
*H04W 24/08* (2009.01)

(52) U.S. Cl.
CPC ........... *H04W 24/04* (2013.01); *H04W 16/14* (2013.01); *H04W 24/08* (2013.01)

(58) Field of Classification Search
CPC ..... H04W 24/04; H04W 16/14; H04W 24/08; H04W 24/02
See application file for complete search history.

(56) References Cited

U.S. PATENT DOCUMENTS

2019/0246293 A1 8/2019 Halabian et al.
2019/0320332 A1 10/2019 Halabian et al.
2020/0322960 A1 10/2020 Monajemi et al.

FOREIGN PATENT DOCUMENTS

CN 109413730 A * 3/2019 .......... H04W 52/243
JP 2014120900 A * 6/2014
WO 2021168753 9/2021
WO 2022217083 10/2022

OTHER PUBLICATIONS

Ortiz-Gomez, "Machine Learning for Radio Resource Management in Multibeam GEO Satellite Systems," www.mdpi.com, Mar. 23, 2022, pp. 1-29.

* cited by examiner

*Primary Examiner* — Said M Elnoubi
(74) *Attorney, Agent, or Firm* — Polsinelli P.C.

(57) ABSTRACT

In one aspect, a method includes monitoring telemetry and wireless frequency restrictions for a portion of access points in a network, wherein configurations for the portion of the access points in the network are managed by the network controller, identifying a qualifying event, wherein the qualifying event is sufficient to trigger an unscheduled RRM operation on a portion of the access points in a network, and triggering an RRM request after the identification of the qualifying event.

20 Claims, 7 Drawing Sheets

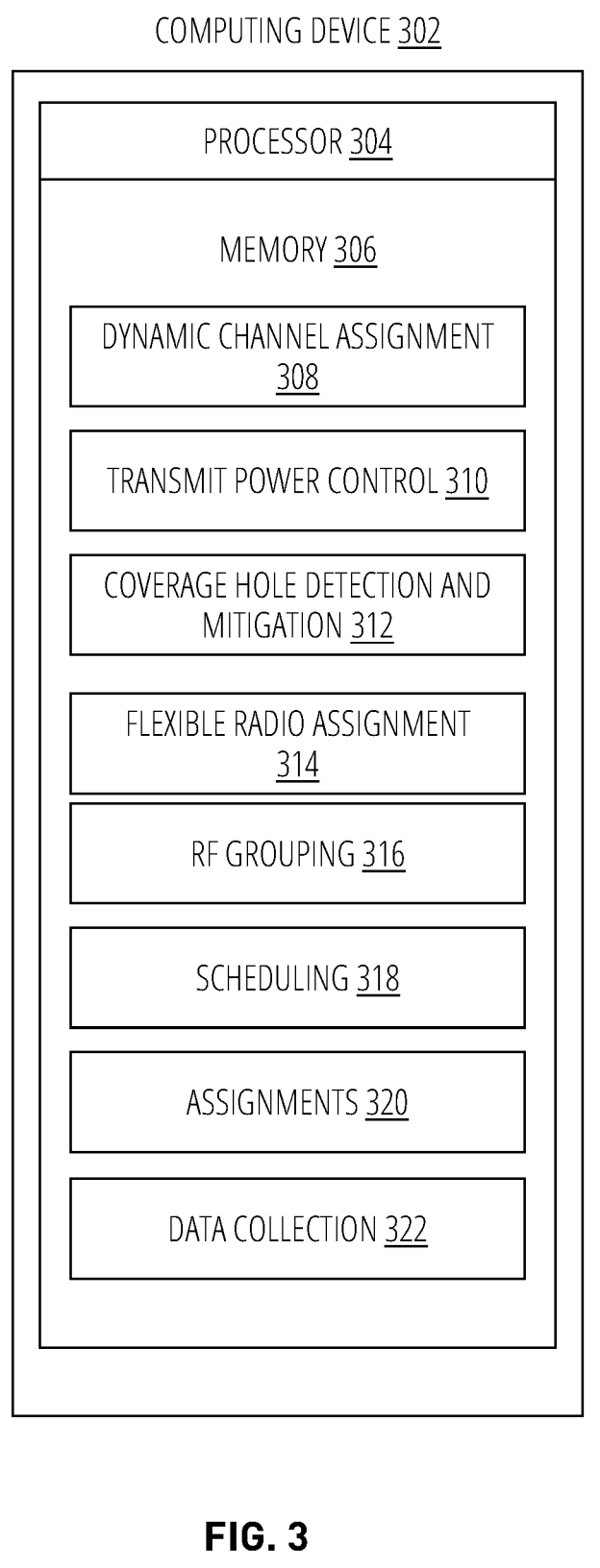

COMPUTING DEVICE 302

PROCESSOR 304

MEMORY 306

DYNAMIC CHANNEL ASSIGNMENT
308

TRANSMIT POWER CONTROL 310

COVERAGE HOLE DETECTION AND
MITIGATION 312

FLEXIBLE RADIO ASSIGNMENT
314

RF GROUPING 316

SCHEDULING 318

ASSIGNMENTS 320

DATA COLLECTION 322

FIG. 3

MONITORING TELEMETRY AND WIRELESS FREQUENCY RESTRICTIONS FOR A PORTION OF ACCESS POINTS IN A NETWORK 602

DETERMINING A QUALIFYING EVENT 604

NO

YES

TRIGGERING AN RRM REQUEST AFTER THE IDENTIFICATION OF THE QUALIFYING EVENT 606

TRIGGERING AN RRM OPERATION AFTER RECEIVING THE RRM REQUEST 608

REQUESTING AN UNSCHEDULED RADIO RESOURCE MANAGEMENT (RRM) OPERATION

FIELD OF THE TECHNOLOGY

The subject matter of this disclosure generally relates to the field of computer networks, and more particularly to the management of radio resources of devices in wireless networks of a physical location.

BACKGROUND

Wireless systems employ processes to manage the radio resources of the wireless devices to optimize parameters including channelization, transmit power, etc. The management of the radio helps avoid or mitigate issues with signal interference, bandwidth contention, etc. Newer Wi-Fi standards allow for more bandwidth capacity for Wireless Local Area Network (WLAN). With wide channel bandwidths, e.g., up to 160 MHz, and very high data rates, higher throughput through the WLAN can be attained. However, usage of wide bandwidths contributes to high frequency reuse, which can cause more interference on at least some channels, among Basic Service Sets (BSSs) in a Radio Frequency (RF) neighborhood. Thus, the Access Points (APs) providing wireless access to the WLAN carefully administer Radio Resource Management (RRM) to balance the higher bandwidth capacity and the increased interference potential (caused by overlapping spectrum) when selecting the higher bandwidths.

Access Points (APs) may rely on other communications technologies to connect to the rest of the network or Internet. A common connection is an Ethernet switch, which can be directly attached to the AP. Other technologies, such as 5G networks or Data Over Cable Service Interface Specifications (DOCSIS), may also be used for the management of network resources. The actual capability of the RRM to manage resources based on the actual capacity that the AP can provide to its connected stations may be restricted based on constraints of the APs caused by power failures and system restarts. As a result, service is often interrupted and an RRM is manually triggered in order to resume service.

Using current Radio Resource Management (RRM) techniques, automation schedules RRM computation requests at regular intervals. However, these events or circumstances may be interrupted before the period is completed and the system does not reconfigure, thus leading to poor performance until the next RRM request is fulfilled.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a computing device that performs various RRM steps/methods according to some aspects of the present technology.

DETAILED DESCRIPTION

Figure 1:
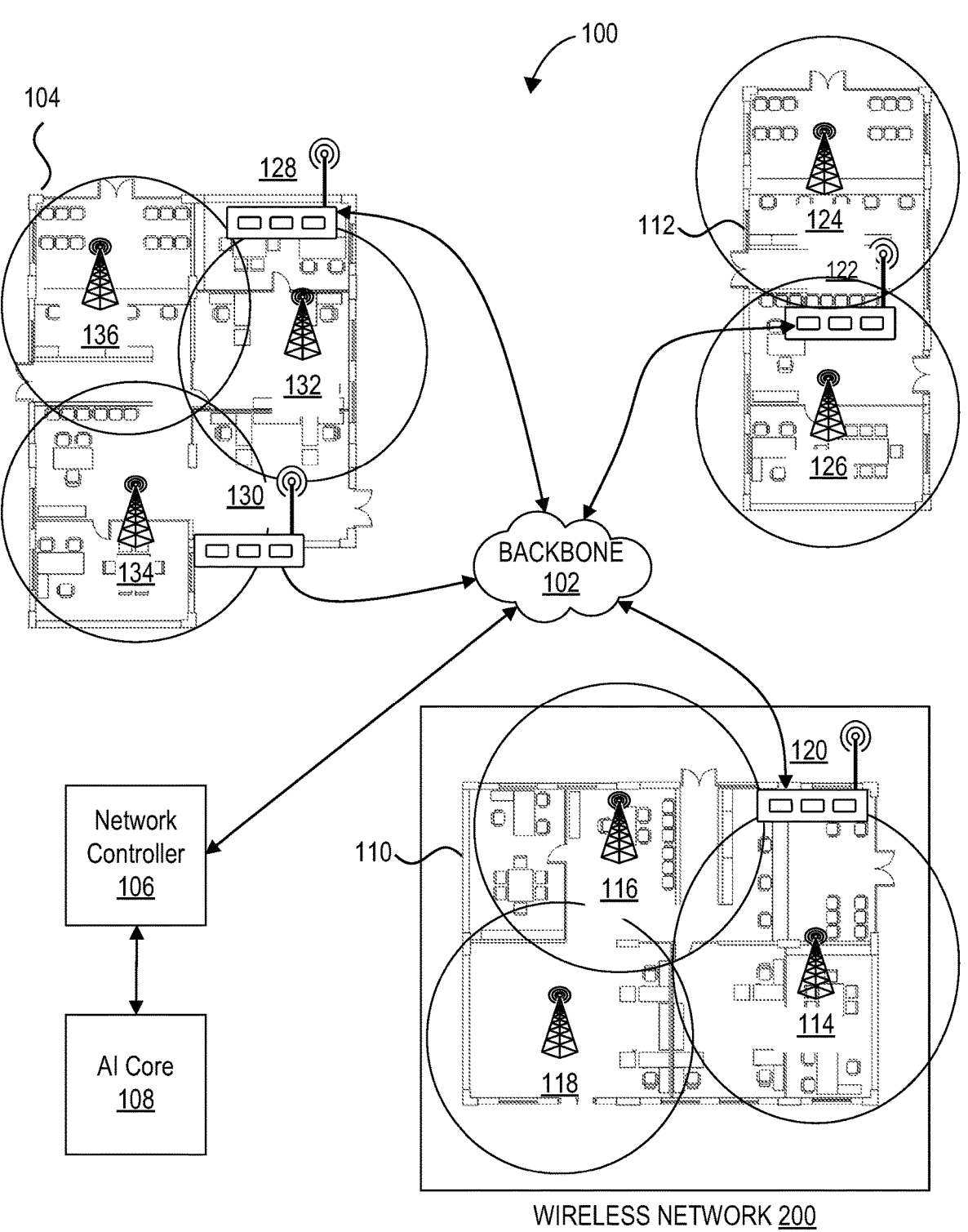
FIG. 1 illustrates an example of a system network, according to some aspects of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

In a wireless network of a physical location, radio resource management can use RF topology to consider available resources of a specific area or environment of the physical location. The radio frequency (RF) topology considers the physical infrastructure, such as antennas, access points, radio nodes, and other transmitting/receiving devices, as well as environmental factors like interference, noise, and obstacles that can affect signal strength. The RF topology is used to optimize the available channels by maximizing signal transmission and reception quality. This is done by factoring in the physical infrastructure and environmental factors, such as interference from other sources, obstacles, or noise to create an optimized communication network. With this information, a system can allocate resources to ensure maximum coverage for a given area with minimal disruption. Radio resource management thus becomes more efficient and reliable, allowing for better communication and improved service quality.

The present disclosure is directed towards a method for requesting, by a network controller, an unscheduled RRM operation. The disclosed technology is designed to better manage RRM requests. Instead of triggering the RRM requests on a regular, periodic basis, the RRM requests are triggered by sudden changes in the RF topology. This means that, in addition to routine maintenance activities, RRM requests can be generated when external triggers occur. Examples of these triggers include power failures, system restarts, firmware/software upgrades, radar events, and automated frequency coordination (AFC) system updates. Automation can be used to automatically request RRM compute requests when a certain percentage of radios are affected by these triggers. This helps the technology stay ahead of larger changes in the RF topology, ensuring that the network is running properly and efficiently.

In one aspect, a method for requesting, by a network controller, an unscheduled RRM operation is disclosed. The method includes monitoring telemetry and wireless frequency restrictions for a portion of access points in a network, wherein configurations for the portion of the access points in the network are managed by the network controller.

The method includes identifying a qualifying event, wherein the qualifying event is sufficient to trigger an unscheduled RRM operation on a portion of the access points in a network. The method includes triggering an RRM request after the identification of the qualifying event.

In another aspect, the qualifying event is caused by a power failure, a system restart, or a radar event affecting a threshold amount of the access points.

In another aspect, the threshold amount of the access points is a percentage of neighboring access points within a physical location.

In another aspect, the qualifying event is caused by an update to an automated frequency coordination (AFC) system affecting frequency assignments for a threshold amount of the access points.

In another aspect, the method includes triggering an RRM operation after receiving the RRM request, the RRM operation is effective to re-configure the portion of the access points impacted by the qualifying event to operate within the network with respective configurations designated by the network controller for the purpose of achieving at least one targeted key performance indicator (KPI) indicating acceptable network performance.

In another aspect, the qualifying event affects the portion of the access points, and portion of the access points are a subset of access points in the network. Accordingly, the method can further include triggering the RRM operation, wherein the RRM operation is limited to the portion of the access points affected by the qualifying event.

In another aspect, the qualifying event is one in which at least one key performance indicator for the portion of the access points is below a threshold.

In one aspect, a network device includes one or more memories having computer-readable instructions stored therein, and one or more processors. The one or more processors are configured to execute the computer-readable instructions to monitor telemetry and wireless frequency restrictions for a portion of access points in a network, wherein configurations for the portion of the access points in the network are managed by the network controller, identify a qualifying event, wherein the qualifying event is sufficient to trigger an unscheduled RRM operation on a portion of the access points in a network, and trigger an RRM request after the identification of the qualifying event.

In one aspect, one or more non-transitory computer-readable media include computer-readable instructions, which when executed by one or more processors of a network appliance, cause the network appliance to monitor telemetry and wireless frequency restrictions for a portion of access points in a network, wherein configurations for the portion of the access points in the network are managed by the network controller, identify a qualifying event, wherein the qualifying event is sufficient to trigger an unscheduled RRM operation on a portion of the access points in a network, and trigger an RRM request after the identification of the qualifying event.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Some wireless communications systems (for example, Wi-Fi or WLAN systems) may support allocating multiple resource units (RUs) over a channel bandwidth. For example, an access point (AP) may allocate each of multiple RUs to one or more respective stations (STAs). For example, the AP may transmit a downlink (DL) OFDMA communication that includes multiple RUs each addressed to a respective STA. Similarly, the AP may transmit scheduling information to multiple STAs that indicates an RU allocation. The RU allocation may indicate which RU each of the STAs is to use to transmit an uplink (UL) OFDMA communication to the AP. Each of the RUs includes a fixed number of tones or subcarriers. Some of the tones (a majority of the tones in some cases) are used to carry data symbols, and some of the tones ("pilot tones") are used to carry pilot symbols. Pilot signals may be transmitted with the data to improve reception and reliability of the data.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Dynamic RRM requests driven by topology events empower network controllers to make intelligent choices for optimizing wireless networks using automation and AI-driven technologies. Conventional systems rely on an automation process that schedules periodic RRM compute requests, potentially leading to limitations during unforeseen events or circumstances occurring before a timer period ends. This can result in system disruption, improper reconfiguration, and subpar performance. Therefore, implementing a dynamic RRM request system based on topology events is crucial to ensure prompt and precise adjustments to wireless networks in response to changes in the environment or conditions. Such systems can detect these alterations and immediately issue an RRM request, enabling the wireless network to reconfigure efficiently and maintain optimal performance.

The RF topology can be evaluated based on channel losses that are affected by distances between a set of APs from the transmission source, objects within, the environment, and the frequency. For example, the wall that is positioned between a first AP and a second AP can prevent a signal transmitted from either AP from being received. For example, losses are exponentially related to the frequency, and 5 GHz and 6 GHz signals typically do not penetrate objects. The object's characteristics are also relevant too, with hard, denser materials causing more loss than softer, light materials.

Accordingly, the disclosed technology addresses the need in the art for RRM requests being triggered by significant changes in the RF telemetry and that take into account network topology. An RRM compute request can be dynamically triggered when more than a percentage of the radios are impacted due to external triggers. In some aspects, the percentage of radios is with respect to a segment of the network topology as distinguished from the percentage of radios in the entire network.

In this case, the system may be configured to model the location of the APs based on a channel loss, which can also be referred to as RF distance and corresponds to a loss. As described above, the channel loss does not necessarily correlate to the physical distance. For example, the physical distance between the first AP and the fifth AP is greater than the distance between the second AP and the fourth AP, but the channel loss between the second AP and the fourth AP is much greater than the loss between the first AP and the fifth AP. For example, as described above, any transmission from the second AP is not received by the fourth AP due to the losses due to wall.

In the disclosed technology, the RRM system can be triggered by variations in the RF telemetry and the location of the APs. The RRM system can respond to requests for RRM in the event of the need for regular maintenance of the system and when certain triggers are detected. Thus, the RRM system can avoid the need to overly depend on periodic requests. Examples of triggers include power outages, system restarts, firmware/software updates, radar events, and automated frequency coordination (AFC) system updates. The automation system of the disclosed technology can continuously monitor and detect when a certain percentage of the radios in the network are affected by these external triggers and can dynamically trigger an RRM compute request so that the wireless network can be quickly reconfigured to ensure optimal performance so that any changes that occur in the environment can be quickly responded to. In some aspects, the triggers might only affect a portion of the network or a portion of the access points in the network.

Figure 2:
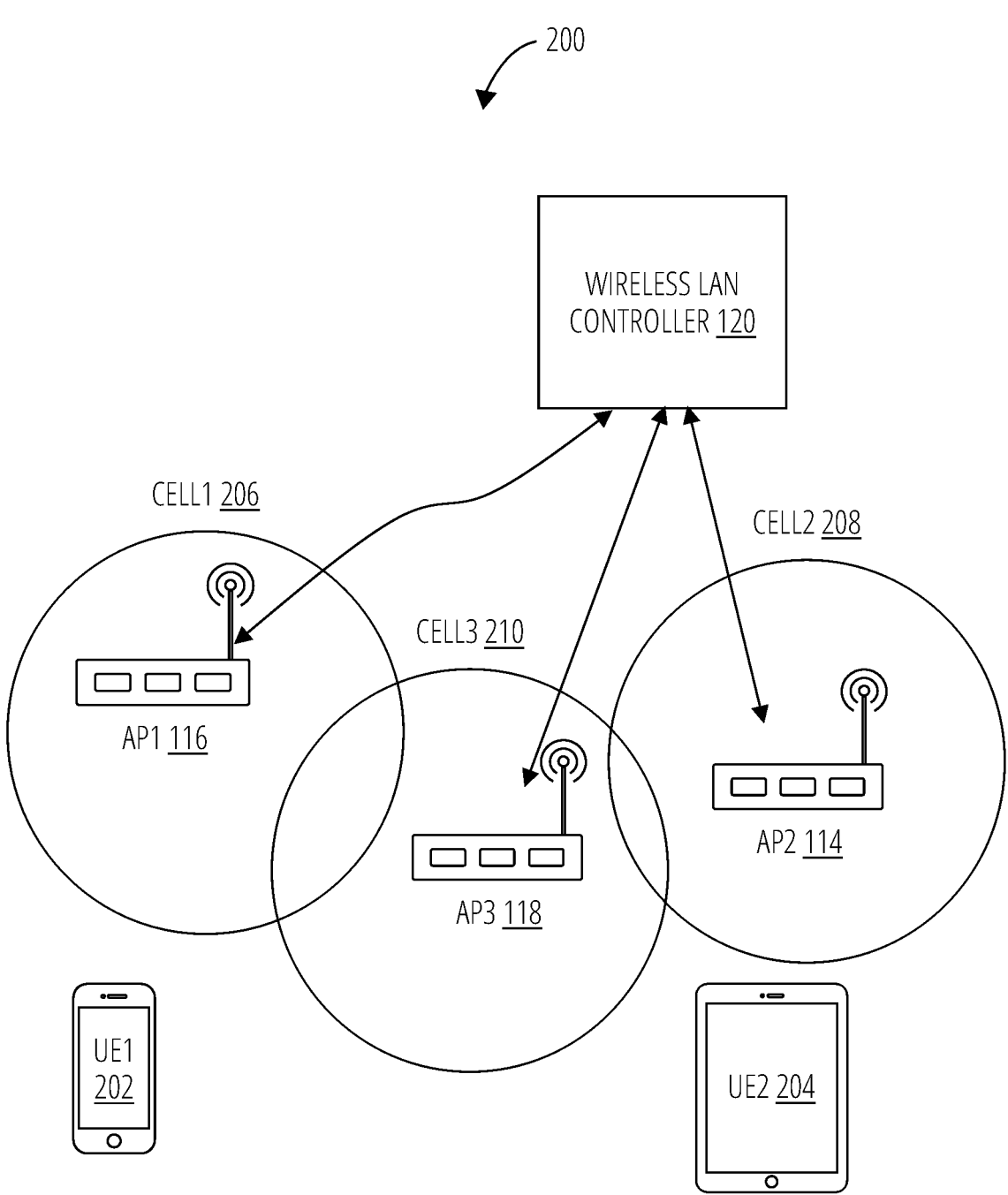
FIG. 2 illustrates an example wireless network according to some aspects of the present technology.

Prior to describing the proposed techniques and methods, example network environments and architectures for the triggering of RRM compute requests, as illustrated in FIG. 1, FIG. 2 and FIG. 3 are described first.

FIG. 1 illustrates an example of a system network 100 that includes three buildings (i.e., building A 104, building B 110, and building C 112). In this non-limiting example, building A 104 includes two wireless local area network (LAN) controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. Building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). In some embodiments, the WLCs are access points, where the grouping of access points has elected one of the access points to be the WLC. The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via control and provisioning of wireless access points (CAPWAP) protocol.

The settings of the WLCs can be controlled by a network controller 106, which communicates with the WLCs via the backbone 102. For example, the network controller 106 can be a CISCO Digital Network Architecture (DNA) center, which is a centralized intent-based network management system. The network controller 106 can be based in the cloud, for example. Further, an artificial intelligence (AI) core 108 communicates signals to and from the network controller 106. The A.I. Core 108 can, e.g., signal configuration recommendations, and then some or all of the configuration recommendations can be implemented by the network controller 106, which signals network settings and configurations to the WLCs. The WLCs then apply the configurations and settings to the APs.

For example, the network controller 106 can receive signals from each WLC. Each of the signals received can be monitored and monitor the signals received for telemetry and wireless frequency restrictions that may be caused by the configurations of the APs. The signals received can be affected by the structure of each of the three buildings (i.e., building A 104, building B 110, and building C 112). Although each building may have various AP configurations or structural elements that make up the WLCs of each of building A 104, building B 110, and building C 112. Each portion of building A 104, building B 110, and building C 112 may have a plurality of APs positioned through a floorplan of each of the buildings, each of which may have one or more communications with neighbor APs that may affect the overall performance of the network. The effect of data traffic transmitted between each of the APs can be monitored based on the telemetry data collected on the wireless network 200.

For example, the A.I. Core 108 can receive information such as telemetry data collected on the wireless network 200, and the A.I. Core 108 processes the received information to generate configuration recommendations for the wireless network 200. The configuration recommendations can be provided based on structural changes in the buildings, or an overload of data traffic in any portion of the APs for each of the WLCs. The received information may include information related to transmission, reception, interference, exceptions, mitigation events, and so forth. In some aspects, the APs may also collect telemetry information from each other and may communicate using a neighbor discovery protocol (NDP). The A.I. Core 108 may be, for example, a cloud-based application that learns from the wireless network 200 and from additional wireless networks how best to optimize the network configurations based on data and measured values from the respective networks. The configuration recommendations are then sent from the A.I. Core 108 to the network controller 106. The recommendations received can trigger the initiation of RRM operations to improve the overall network performance of one or more of the WLCs monitored by the network controller.

In some examples, each of building A 104, building B 110, and building C 112 represent multiple portions of the same building, as multiple floors, or as a part of the same geographical region. The network controller 106 can monitor, via the backbone 102, each of the buildings to determine how to most efficiently provide network resources to handle data traffic as it affects each building during various time periods or upon experiencing qualifying events.

FIG. 2 illustrates an example wireless network 200 according to some aspects of the present disclosure. The wireless network 200 includes a wireless LAN controller 120, and several access points (APs) (e.g., AP1 116, AP2 114, and AP3 118). The wireless LAN controller 120 and the APs (e.g., AP1 116, AP2 114, and AP3 118) can all serve in the capacity of an AP or a WLC. The WLC can be an AP that was elected group leader through a peer election mechanism. Each AP has a surrounding cell in which user devices, such as user equipment 1 (UE1) 202 and UE 2 (UE2) 204 can wirelessly communicate with the respective AP of the cell (e.g., cell1 206 surrounds AP1 116; cell2 208 surrounds AP2 114; cell3 210 surrounds AP3 118). As the user device moves from one cell to the next, the user device will change which cell it is communicating with. The wireless network 200 provides wireless communications with one or more devices, such as user devices and various other user equipment.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications of the network administrator (or other uses and users).

The wireless LAN controller 120 can communicate with a wide area network (WAN) to allow the user devices to access the internet, for example. The wireless LAN controller 120 can give the network administrator the ability to monitor and trace all the data traffic between the APs, and the information associated with the performance of the network, including key performance indicators (KPIs). Based on the KPIs and the monitored data traffic, the wireless LAN controller 120 can dynamically adjust the configurations of the APs to meet network demands based on increased data traffic during various time periods and the management of devices that are allowed to connect to the network. The wireless network 200 can be a WiFi network operating in accordance with an IEEE 802.11 protocol.

The A.I. Core 108 and/or the network controller 106 can be used to perform radio resource management (RRM). RRM allows the wireless network 200 to continuously analyze the existing RF environment and automatically adjust each APs' power and channel configurations to help mitigate interference (e.g., adjacent channel interference, co-channel interference, electromagnetic interference, etc.) and signal coverage problems. RRM can reduce the need to perform exhaustive site surveys, and RRM can increase system capacity, and provides automated self-healing functionality to compensate for RF dead zones and AP failures. The RRM, in furtherance of performing RRM operations, can also perform radio resource monitoring, power control transmission, dynamic channel assignment, coverage hole detection and correction, and RF grouping.

In some examples, the RRM operations can be determined and instructions provided by the A.I. Core 108 and/or the network controller 106. The network appliances of the wireless network 200 are configured to interface with the A.I. Core 108 and network controller 106 to provide real-time RF management of the wireless network 200. Real-time RF management can be based on the monitoring of interference, noise levels, the received signal strength (RSSI), and signal-to-noise ratio (SNR) for all connected clients and the traffic load of the network, including the total bandwidth used for transmitting and receiving traffic for AP1 116, and AP2 114, as it relates to each of the UE1 202 and UE2 204.

RRM includes several algorithms, which together provide management of the wireless network 200 and resources of the wireless network 200. FIG. 3 illustrates a computing device 302 that performs various RRM steps/methods capable of performing algorithms for radio resource management of a network. Computing device 302 can be performed using distributed computing. Some or all of the functions of computing device 302 can be performed by the WLCs and some or all of the functions may be performed by the network controller 106 and/or the A.I. Core 108. In some examples, the computing device 302 can be an embodiment of the A.I. Core 108, illustrated in FIG. 2. In some embodiments, the functions attributed to computing device 302 may reside across the A.I. Core 108, the network controller 106, and other devices illustrated in wireless network 200. The computing device 302 includes a processor 304 that performs the steps of the respective methods when executing the respective methods stored in memory 306. The methods stored in the memory 306 can include, for example: (i) RF Grouping 316 (e.g., an algorithm responsible for determining the RF Group Leader and members); (ii) Flexible Radio Assignment (FRA) 314 (e.g., an algorithm charged with identifying redundant radios resources and re-assigning the resource to a better role); (iii) Dynamic Channel Assignment (DCA) 308 (e.g., a global algorithm that runs on the RF Group leader); (iv) Transmit Power Control (TPC) 310 (e.g., a global algorithm that runs on the RF Group Leader; and (v) Coverage Hole Detection and Mitigation (CHDM) 312 (e.g., a local algorithm that runs on each individual controller). The respective methods help to maintain optimal performance by optimally applying resources to balance various countervailing interests.

For example, increasing the transmit power in a cell (e.g., cell1 206 of an AP1 116) may help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of the available spectrum, the management traffic also increases, which also takes up a part of the channel capacity. The result is higher consumption of air time and less throughput. This is commonly known as co-channel interference. Assuming all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, avoiding interference in overlapping regions between cells.

The use of RRM has several advantages, including features that manage specific traffic types or client types, which can greatly increase spectral efficiency and assist RRM in providing a better user experience. RRM can further provide advantages including improved quality of service, increased resilience and reliability, better utilization of resources, reduced maintenance costs, enhanced spectrum efficiency, and faster response times to changes in the environment. RRM can be used to reconfigure networks dynamically so that they are able to adjust quickly when something unexpected occurs without needing manual intervention. This ensures that the network is running optimally and maximizes efficiency. Additionally, RRM allows for more precise control over the wireless environment, leading to better user experience and improved overall performance.

The RRM can be organized according to a hierarchy with an RF Group Name at the top level, then RF Group leader(s) at the next level, which is then followed by RF Neighborhood(s) at the lower level, For any RF Group Name, multiple RF group Leaders may exist (e.g., one or more RF group Leaders frequencies in the 2.4 gigahertz (GHz) band and one or more RF group Leaders frequencies in the 5 GHz band). An RF Group Leader can manage multiple RF Neighborhoods.

The hierarchical structure of RRM begins with the RF Group Name and is followed by location, floor, department, building, and network. Each level in the hierarchy adds another layer of detail that helps define the network configuration's scope. This allows for more granular control over monitoring and managing the RF topology. At each level, specific parameters can be adjusted to customize the network configuration in order to get the best performance under different conditions. This hierarchical structure allows for maximum customization of RRM to effectively meet the needs of a given network environment.

The RF grouping 316 methods are used as the basis for the administrative and physical management domains within the RF Network. Regarding the administrative domain, the proper function of the RRM is based on knowing which APs and controllers are under administrative control for each part of the network. For example, the RF Group name can be an identifier that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (e.g., a group of APs that belong to the same RF Group that can physically hear one another's neighbor messages above −80 dBm, for example). Each RF Group has at least one RF Group Leader per frequency band (e.g., 2.4 GHz, 5 GHz, 6 GHz). The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel on an interval (e.g., every 60 seconds or less). The NDP packet is a broadcast message that APs listen for and allows the AP to understand how every radio on every channel hears every other radio. The NDP packet also provides the actual RF path loss between APs. When an AP receives an NDP message, the AP validates whether the message is from a member of its RF Group. If the NDP message is valid, the AP forwards the message along with the received channel and RSSI to the controller. The forwarded message is added to the neighbor database, which is periodically forwarded to the RF group leader. For each AP, each radio can store up to a predefined number of neighbors ordered by RSSI high to low. Postprocessing of the RSSI information can generate measurements for receiving (RX) Neighbors (e.g., how the given AP hears other APs) and transmitting (TX) Neighbors (e.g., how other APs hear the given AP).

The FRA 314 uses the NDP messages to locate each radio based on RF distance and evaluate overlapping coverage by cell. Now, the flexible radio assignment 314 methods is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the AP's coverage intersections. Based on this understanding, FRA uses a multipoint analysis to determine the percentage of overlapping coverage for each evaluated AP. The output of this calculation is the Coverage Overlap Factor % (COF). The COF is the percentage of the analyzed cell covered at −67 dBm or higher by other radios in service. In calculating this coverage, the FRA method 314 keeps track of radios that are coverage contributors to other radios COF, and the FRA method 314 prevents those radios to be marked redundant as long as a radio they are a contributor for is marked redundant.

Once a Radio is marked redundant, the next step depends on the radio configuration. For example, there can be two (or more) operational states to which the flexible radio can be assigned: (i) FRA-auto or (ii) manual. When the radios are in the "FRA Auto" state, flexible radios can be assigned in order to allow for dynamic reconfiguring of the network, thus, FRA looks to DCA to decide what to do with the now redundant radio(s). DCA's priorities are, first, to try to assign the redundant radio in 5 GHz and increase capacity, but if the DCA determines that there is already maximum 5 GHz coverage, the radio will be assigned to a monitor role instead. This allows the network controller using RRM algorithms to adjust parameters dynamically as needed in order to allow for more efficient utilization of resources, increased performance, and improved user experience. In this state, the radio is not simply sitting idle but rather is constantly monitoring and adjusting parameters as needed so that it can maintain optimal performance at all times.

Regarding the dynamic channel assignments 308 method, the DCA monitors the available channels for the RF group and tracks the changing conditions. The DCA then optimizes the RF separation between APs (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted Signal to Noise Interference Ratio (SNIR). The Group Leader can maintain the neighbor lists for all APs in the RF Group and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel—rogue (e.g., other non-RF Group APs operating on or overlapping with the APs served channel); (iii) noise (e.g., sources of interference such as Bluetooth, analog video, or cordless phones); (iv) channel load (e.g., through the use of industry-standard QBSS measurements—these metrics are gathered from the physical (Phy) layer—very similar to customer acquisition cost (CAC) load measurements); and (v) DCA sensitivity (e.g., a sensitivity threshold selectable by the user that applies hysteresis to the evaluation on channel changes). The impact of each of these factors can be combined to form a single RSSI-based on the metric known as the Cost Metric (CM). The CM then represents complex and SNIR of a specific channel, which is used to evaluate the throughput potential of one channel over another. The goal is to select the best channel for a given AP/Radio that minimizes interference.

The transmit power control 310 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information, TPC sets the transmit power of each AP to maximize the coverage and minimize co-channel interference. TPC will adjust the Tx power up or down to meet the coverage level indicated by the TPC Threshold. TPC runs on the RF Group leader and is a global algorithm that can be sub-configured in RF profiles for groups of APs in an AP group.

According to examples of the disclosure, the CHDM 312 can be used to achieve the following objectives: (i) detect coverage holes, (ii) validate the coverage holes, and (iii) mitigate the coverage holes. That is, CHDM 312 first detects and mitigates coverage holes (if possible without creating other problems) by increasing the transmit power and, therefore cell area. According to certain non-limiting examples, CHDM can be a local algorithm independent of RRM and the RF Group leader. To facilitate making decisions at a local level, CHDM can run on every controller. That is, each individual controller performs coverage hole detection monitoring all associated APs and thus monitoring every attached client and their received signal levels. Mitigation involves increasing the power on an AP, or group of APs to improve coverage levels to a certain area where client signals fall below a customer selectable threshold.

According to certain non-limiting examples, coverage hole detection can be based on a 5-second coverage hole detection (CHD) measurement period histogram of each client's RSSI values maintained by the AP. Values between −90 and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process performed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify, and power will again be increased by 1 step. This incremental approach can prevent wild and unstable swings in power.

Coverage hole mitigation, while operating independently of DCA and TPC, can significantly affect surrounding APs and the balance of the RF in an environment. Part of the decision to mitigate is based on evaluating whether the mitigation could be successful. Increasing the power of a given AP independently of the RF Group metrics is likely to negatively impact surrounding APs. So mitigation can be applied judiciously. The combination of the new detection metrics and the power limits included in mitigation are applied to make CHDM a stable algorithm.

In addition to the above methods, the memory 306 of the computing device 302 can also store information for scheduling 318, assignments 320, and information for data collection 322. The data collection 322 can include several types of measurements.

With respect to data collection 322, the RRM processes collected data, which is then used in the organization of RRM as well as for processing channel and power selections for the connected APs. Now, a discussion is provided for how and where to configure monitoring tasks and how the collected data relates to an operational environment.

The collected data processed by the RRM can include several RRM metrics that assist with monitoring the network's overall performance or a portion of the APs in the network. Some common RRM metrics include signal strength, signal-to-noise ratio (SNR), throughput, latency, jitter, packet loss rate, and utilization. These metrics all indicate different aspects of performance within the wireless environment and are important in order to get an accurate picture of how the network is operating. Signal strength and SNR are used to measure the quality of the connection, throughput, and latency are used to measure how quickly data is able to travel over the network, jitter measures how consistent the connection is, packet loss rate indicates how many packets of data are being dropped along the way, and utilization measures the amount of capacity that is being used on a given channel. These metrics help indicate how well RRM is performing and can be used to determine if any changes need to be made.

Channel scanning, such as passive channel scanning, can be performed on all channels supported by the selected radio. Additionally, or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can detect rogue devices and collect noise and interference metrics. Also, a Neighbor Discovery Protocol Transmission (TX) can send the NDP message from all channels defined to be part of a monitor set.

Figure 4A:
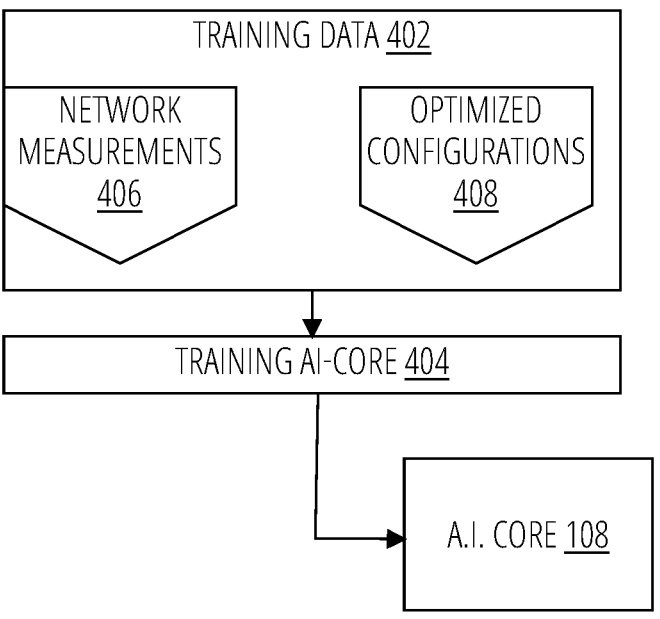
FIG. 4A illustrates an example of training the artificial intelligence (A.I.) Core according to some aspects of the present technology.

FIG. 4A illustrates an example of training the A.I. Core 108. In block 404, training data 402 is applied to training the A.I. Core 108. For example, the A.I. Core 108 can be an artificial neural network (ANN) that is trained via supervised learning using a backpropagation technique to train the weighting parameters between nodes within respective layers of the ANN. Training data 402 is obtained in training AI-core 404, supervised learning is obtained, and the network is iteratively updated to reduce an error/loss function. The value of the error/loss function decreases as the A.I. Core 108 outputs configurations that increasingly approximate the optimized configurations 408. In other words, ANN infers the mapping implied by the training data, and the error/loss function produces an error value related to the mismatch between the optimized configurations 408 and the output from the A.I. Core 108 that is produced by applying the network measurements 406 to the A.I. Core 108. For example, in certain implementations, the cost function can use the mean-squared error to minimize the average squared error. In the case of a multilayer perceptron (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. The optimization is performed by taking the derivative of the cost function with respect to the network parameters and then changing those parameters in a gradient-related direction. Non-limiting examples of backpropagation training algorithms include: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the A.I. Core 108.

The training in block 404 404 of the A.I. Core 108 can also include various techniques to prevent overfitting to the training data 402 and for validating the trained A.I. Core 108. For example, boot strapping and random sampling of the training data 402 can be used during training.

In addition to supervised learning used to initially train the A.I. Core 108, the A.I. Core 108 can be continuously trained by using reinforcement learning based on the network measurements and the corresponding configurations used on the network. The A.I. Core 108 can be cloud-based and can be trained using network measurements and the corresponding configurations from other networks that provide feedback to the cloud.

Further, other machine learning (ML) algorithms can be used for the A.I. Core 108, and the A.I. Core 108 is not limited to being an ANN. For example, there are many machine-learning models, and the A.I. Core 108 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, GANs, support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
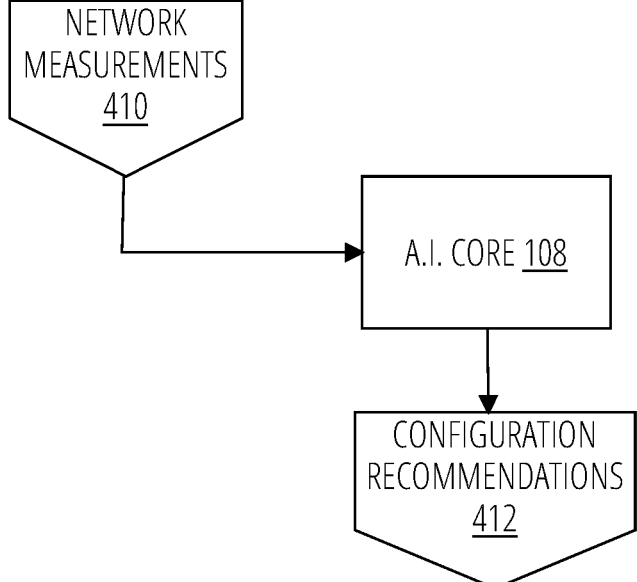
FIG. 4B illustrates an example of using the trained AI Core according to some aspects of the present technology.

FIG. 4B illustrates an example of using the trained A.I. Core 108. A.I. Core 108 can be trained to provide RRM configuration in order to optimize the performance of a wireless network. This is done by providing the A.I. Core 108 with data related to variables such as signal strength and latency. With this data, the A.I. Core 108 is able to identify patterns that would otherwise not be visible initially, and assist with providing configuration recommendations to the network controller, to provide for a more efficient, stable network environment.

The actual network measurements are applied to the trained A.I. Core 108, which then generated configuration recommendations 412. The configuration recommendations will then be provided to a network controller 106, which selectively applies the configuration recommendations in accordance with the settings therein. For example, the configuration recommendations can be applied a predefined times for certain portions of the wireless network 200. For example, certain configuration recommendations may be applied when there is a radio reset. Other configuration recommendations be applied when there is minimal risk of disrupting service during business hours. Further, different regions within the wireless network 200 might be scheduled differently.

Figure 5:
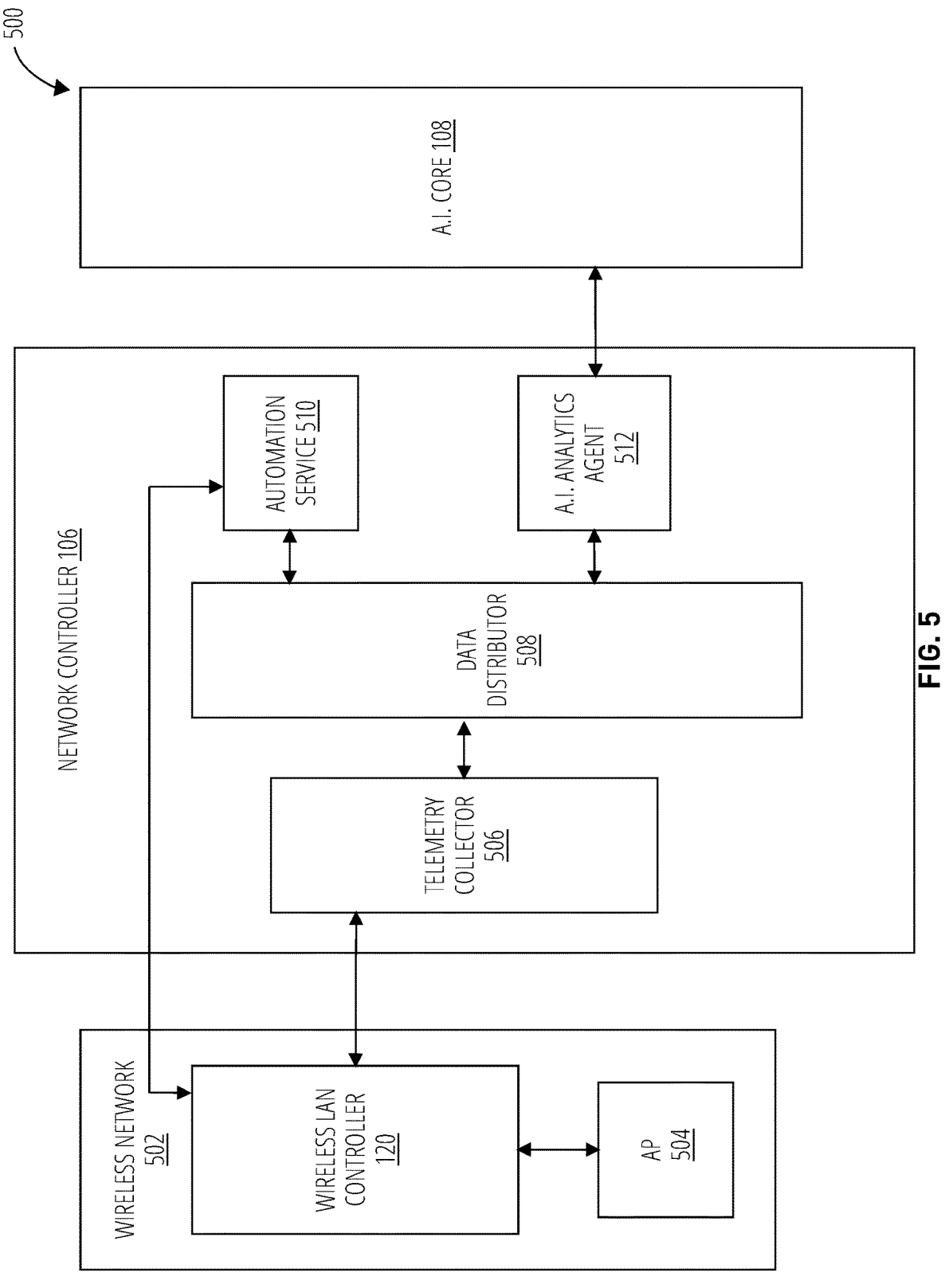
FIG. 5 illustrates an example process of transmitting configuration recommendations to APs based on radio frequency (RF) telemetry according to some aspects of the present technology.

FIG. 5 illustrates an example system 500 for transmitting configuration recommendations to APs based on RF telemetry according to some aspects of the present disclosure.

FIG. 5 shows a wireless network 502, including at least one wireless LAN controller (while wireless LAN controller 120 is illustrated throughout FIG. 5, the WLAN controller can be any of WLAN controllers in the network, including wireless LAN controller 120, WLC B 122, WLC A1 128, WLC A2 130, etc.) in communication with at least one Network controller 106 that analyzes data via the A.I. analytics agent 512 and A.I. Core 108. The Network controller 106 includes components such as a telemetry collector 506, Data distributor 508, automation service 510, and A.I. analytics agent 512, all of which are communicatively connected to the A.I. Core 108. This architecture allows network controllers to monitor access points 504 via telemetry reported to the network controller 106 and wireless frequency restrictions with the help of AI core technology. While the APs 504 and the wireless LAN controller 120 have limited ability to locally adjust some operating parameters based on local RF conditions, better overall network performance is achieved when configuration decisions are made by the network controller 106, which has information about the larger RF environment. However, even network controller 106 is limited in that its RRM capabilities are limited by training on data for the particular network to which the network controller 106 manages. Further, the network controller 106 might be limited in the amount of historical information it can store and analyze to provide the system 500 with the benefits of longer-term insights. Therefore, giving the network controllers the ability to receive RRM configurations from both the network controller 106 and the A.I. Core 108 can improve overall performance.

The wireless LAN controller 120 is connected to network controller 106 through a CAPWAP protocol that allows the network controller 106 to manage all wireless termination points associated with the network controller 106. The network controller 106 monitors this data using RF telemetry sent from the wireless LAN controllers 120 via a tapped delay line (TDL) channel to the telemetry collector 506 located at network controller 106. This data is then sent to the automation service 510 of the network controller 106. The automation service 510 performs continuous monitoring and updating of network parameters, including the report of new channel power updates and network automation.

According to some examples, AP 504 as shown in FIG. 5 is an example of any of AP1 116, AP2 114, AP3 118, AP B1 124, AP B2 126, AP A1 132, AP A2 134, and AP A3 136 in FIG. 1. For example, the network controller 106 in FIG. 1 can manage AP A1 132, AP A2 134, and AP A3 136 of WLC A1 128 through the monitoring of RF telemetry received through the backbone 102. The network controller 106 can transmit the RF telemetry of each of the APs 132, 134, 136 to the A.I. Core 108 to be analyzed for RRM configuration adjustments. The A.I. Core 108 can analyze the RF telemetry and provide continuous updating of the network parameters as received from the network controller 106, including the report of new channel power updates and network automation targeted at improving the telemetry and frequency restrictions of one or more of the APs 132, 134, 136.

The Telemetry collector 506 receives network data from the wireless LAN controller 120 and prepares it for publication to the data distributor 508. This published network is sent to the automation service 510. The automation service 510 is configured to identify any conflicts related to APs 504 and store them to create real-time triggers in response to the conditions experienced on the wireless network 502. When the automation service 510 receives the device configurations, an RF topology of the physical location of the wireless network is generated for transmission to the data distributor 508.

According to some examples, a network controller 106 can receive the RF telemetry from the wireless LAN controllers 120, prior to being received by the A.I. Core 108. The data center can collect the RF telemetry of AP A1 132, AP A2 134, and AP A3 136 of WLC A1 128, and prepare the RF telemetry to be published to the A.I. Core 108 for analysis. When the A.I. Core 108 receives the device configurations, an RF topology of the physical location of the WLC A1 128 can be generated for transmission to the network controller 106 for management of the APs 132, 134, 136, of WLC A1 128.

The A.I. analytics agent 512 can receive data from the Data distributor 508, automation service 510, and A.I. Core 108. In some embodiments, the A.I. analytics agent 512 is an interface to the A.I. Core 108. The A.I. analytics agent 512 can pre-process data, anonymize data, and pass RRM requests between the network controller 106 and the A.I. Core 108. In some embodiments, the A.I. analytics agent 512 can report the data through a user interface plugin.

The automation service 510 is configured to transmit RRM compute requests related to the RF topology and device configurations sent by the data distributor 508 to the A.I. analytics agent 512. Upon receiving the RRM compute requests and RRM telemetry from the data distributor 508, the A.I. analytics agent 512 sends them to the A.I. Core 108 via a gateway.

The A.I. Core 108 then processes this data to identify configuration recommendations and transmits them back to the network controller 106 for further transmission to the data distributor 508. The data distributor 508 then publishes the RRM decision that includes RRM management operations to the automation service 510 for transmission to the network controller 106.

According to some examples, the A.I. Core 108 can process RF telemetry, received from the APs 132, 134, 136, of WLC A1 128, that is published and transmitted by the data center. The A.I. Core 108 can analyze the RF telemetry and identify configuration recommendations that could remedy the restrictions experienced by the APs. The A.I. Core 108 can transmit the configuration recommendations to the network controller 106 which can transmit the configuration recommendations to the wireless LAN controller 120 for implementation amongst APs 132, 134, 136. In some embodiments, the configuration recommendations from A.I. Core 108 can be presented to an administrator to be accepted before being sent to the wireless LAN controller 120 for implementation.

These RRM management operations are not initially scheduled by the network controller 106 and thus, any updated device configurations for the wireless LAN controller 120 initiated by the network controller 106, are transmitted from the automation service 510. The real-time triggers generated by the automation service 510 are due to conditions reported by the Network controller 106. In this manner, the A.I. Core 108 is able to provide the network controller 106 configuration recommendations in response to unscheduled RRM operation requests, which are triggered and executed at the Network controller 106.

Figure 6:
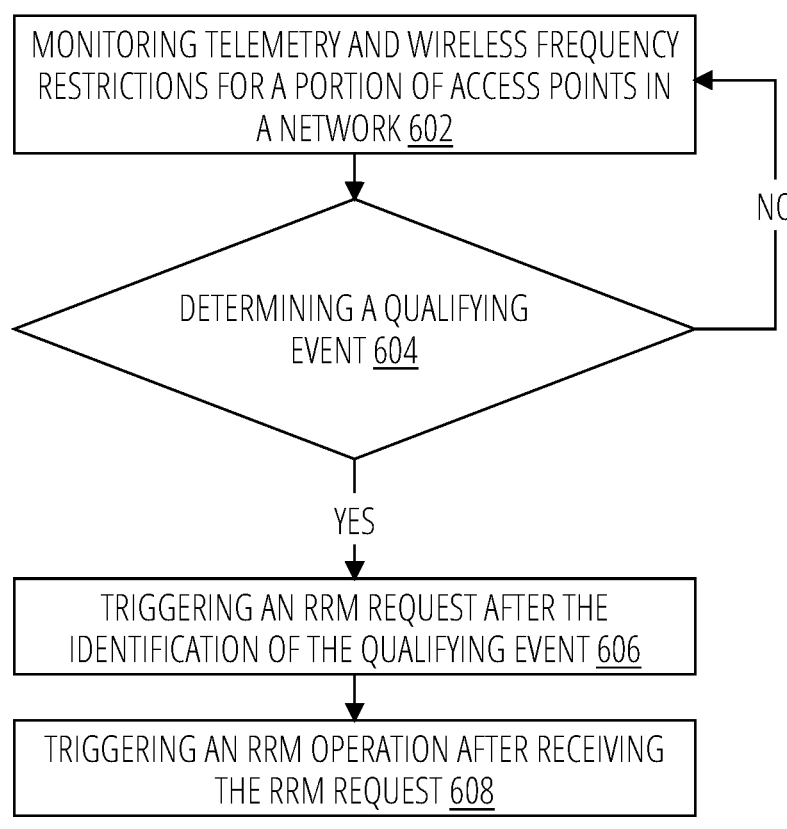
FIG. 6 illustrates an example routine for requesting an unscheduled RRM operation according to some aspects of the present technology.

FIG. 6 illustrates an example routine for requesting an unscheduled radio resource management (RRM) operation. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at the same time or in a specific sequence.

According to some examples, the method includes monitoring telemetry and wireless frequency restrictions for a portion of access points in a network at block 602. For example, the network controller 106 illustrated in FIG. 5 may monitor telemetry and wireless frequency restrictions for a portion of APs 106 in a network for transmission to be analyzed by the A.I. Core 108. Telemetry for the portion of the access points can be used to track data from the RF environment, such as signal strength, latency, and other variables, in order to gather insight into network performance. Additionally, wireless frequency restrictions are utilized to ensure that access points do not interfere with one another by limiting their range of operation. The monitoring of telemetry and wireless frequency restrictions provides the network controller 106 with network data to avoid network congestion, as well as interference with other networks in the area. The network controller 106 can receive an analysis from the A.I. Core 108 of this data to make recommendations for RRM configurations that optimize the overall performance of the wireless network, and portions of the APs 106 being managed by the network controller.

According to some examples, the method includes determining a qualifying event at decision block 604. For example, the network controller 106 illustrated in FIG. 5 may determine a qualifying event. The qualifying event is sufficient to trigger an unscheduled RRM operation on a portion of the access points in a network. The qualifying event is one in which at least one key performance indicator for the portion of the access points is below a threshold.

A qualifying event refers to an instance where at least one KPI for the portion of the access point is below a threshold. As it pertains to the access points, a significant degradation is detected that justifies a disruption in RRM operations to correct the deficiency of the portion of the access points. In some examples, this can be 1-2 standard deviations below an acceptable threshold or target range. Sometimes, the threshold or target range can be predetermined based on previous network historical data recorded from previous qualifying events. In an example, during the detection of a qualifying event, the network controller can identify a section of the physical location served by at least two APs that is impacted by an interrupt including one or more of a power failure, a system restart, a radar event, or an AFC system. Upon one of the interrupts meeting or exceeding a threshold equivalent to an interrupt, the network controller can trigger an RRM request configured to perform an update of the at least two radio nodes affected by the qualifying event.

In some examples, the threshold amount of the access points is a percentage of the neighboring access points in a physical location. In some examples, the threshold amount of the access points is a number of poorly operating access points in a physical location, branch of the network, or throughout the network.

The physical location can refer to a building, floor, retail space, office, etc., containing at least a portion of the access points. The physical location can be a subset of any logically defined physical space. In some embodiments, a physical location can be a physical space serviced by a network neighborhood or a portion of a network neighborhood (e.g., the physical location can be serviced by access points that are physically proximate to one another) are located on the same branch of a network). In some embodiments, a physical location can be a physical space serviced by access points being proximate in an RF topology of the network (e.g., the physical location can be serviced by access points that are proximate enough to detect RF transmissions from access points that are proximate in the RF topology even when those access points are not on the same branch of the network).

According to some examples, the method includes triggering an RRM request after the identification of the qualifying event at block 606. For example, the network controller 106 illustrated in FIG. 5 may trigger an RRM request after the identification of the qualifying event. The qualifying event can be caused by a power failure, a system restart, or a radar event affecting a threshold amount of access points. The qualifying event can be caused by an update to an automated frequency coordination (AFC) system affecting frequency assignments for a threshold amount of the access points.

According to some examples, the method includes triggering an RRM operation after receiving the RRM request at block 608. For example, the network controller 106 illustrated in FIG. 5 may trigger an RRM operation after receiving the RRM request. The RRM operation is effective to configure the portion of the access points impacted by the qualifying event to operate within the network with respective configurations designated by the network controller for the purpose of achieving at least one targeted key performance indicator (KPI) indicating acceptable network performance. The RRM operation is limited to the portion of the access points affected by the qualifying event, wherein the qualifying event affects the portion of the access points, and portion of the access points are a subset of access points in the network.

For example, if there is an interference isolated to one Access Point (AP) on the 5th floor and another interference isolated to one AP on the 2nd floor, the A.I. Core 108, illustrated in FIG. 5 would not detect a trigger. However, if several APs on the 4th floor have an interference, that will prompt A.I. Core 108 to provide an RRM request. By taking into account the RF topology, A.I. Core 108 can avoid sending unnecessary RRM requests that would likely not yield enough of a benefit to make them worthwhile. Additionally, if the network controller 106 detects any changes in the overall topology, such as a change in layout, A.I. Core 108 will also generate an RRM request.

Accordingly, the present technology is able to trigger RRM requests on demand, rather than wait until a designated period for analyzing the network telemetry to look for RRM improvement opportunities. The triggering of the RRM requests allows the network controller 106 manage the APs 106 in the network across multiple sections of the physical location to ensure that the wireless network is optimized with little disruption. Throughout the functionality of a wireless network, APs 106 are often impacted by overloading caused by excessive data traffic, structural changes to a physical location, or configuration disruptions caused by firmware updates to one or more APs 106. By providing on demand RRM requests the network controller can prevent excessive downtime, network latency issues, or lapses in coverage in various sections of the physical location. These autonomous and dynamic changes to the wireless network can ensure that depending on where users of the wireless network or located or more heavily congregated throughout the physical location, the proper amount of resources are allocated, and the most effective configurations are associated with sets of APs 106.

In some embodiments, the present technology can be coupled to an algorithm or function that can weigh the cost and benefit of applying RRM updates to the network. As addressed herein, applying configuration updates to access points can cause devices connected to the APs to drop their connections, which can result in a poor user experience. Accordingly, the present technology can evaluate how significant the qualifying event is based on the analysis of network utilization data. The network utilization data may be gathered consistently over a set duration determined by the network or a network administrator (e.g., 24 hours, one week, etc.). The goal of network utilization data collection is to recognize trends in the network over time. These trends may emerge after varying durations of time. Thus, the length of the data collection period may vary depending on the network. Some networks may require a month of data collection before trends emerge in the data, while some networks may require a week of data collection. The network utilization data may be pertaining to one or more aspects of the network, including, but not limited to, number of connected clients at any given time, number of client disconnects, network usage, network speeds, any combination thereof, or the like. In an example, the A.I. Core 108 can analyze network utilization data for a set of APs 106 in a wireless network managed by the network controller 106.

As addressed herein, it can be useful to understand trends pertaining to network utilization. For example, it can be useful for the network controller to avoid making significant configuration changes to the APs during periods of high utilization since the configuration changes to the APs could result in connection interruptions being experienced by client devices connected to the network. However, it may be too simplistic to designate a static configuration indicating likely period of high utilization because network trends can change over time.

Another reason it can be useful to understand trends pertaining to network utilization is to adjust the configuration of the network to tolerate degraded KPIs that could trigger RRM requests based on interrupt thresholds being met. For example, an RRM algorithm can be subject to a hysteresis factor that can bias the network against making updates to network configurations in some periods and bias the network toward aggressively improving the network in other periods. Additionally, the network can prefer different types of network configurations at different times of day. All of these configurations can be dynamic based off of changes trends in network utilization.

A qualifying event that is significant enough to justify an RRM operation in one situation, might not be significant enough in another circumstance. For example, a network can be subject to a hysteresis factor. During a period of high network utilization, the network might have a high hysteresis factor that can operate to bias the network against RRM operations for all but the most significant ones, i.e., ones that are strongly desired even if network connections need to be dropped. In contrast, during a period of less network utilization, the network might have a lower hysteresis factor, such that RRM operations are generally free to run.

The significance of the qualifying event can also be highly dependent on the topology of the network. Even if the network is subject to a high hysteresis factor that can operate to bias the network against RRM operations if many of the access points in a localized part of the network topology are performing poorly, the event might qualify for the RRM operation either because that portion of the network is performing so poorly that there is little concern about dropped connections, or because the RRM operation would be limited in scope to just that localized part of the network.

Figure 7:
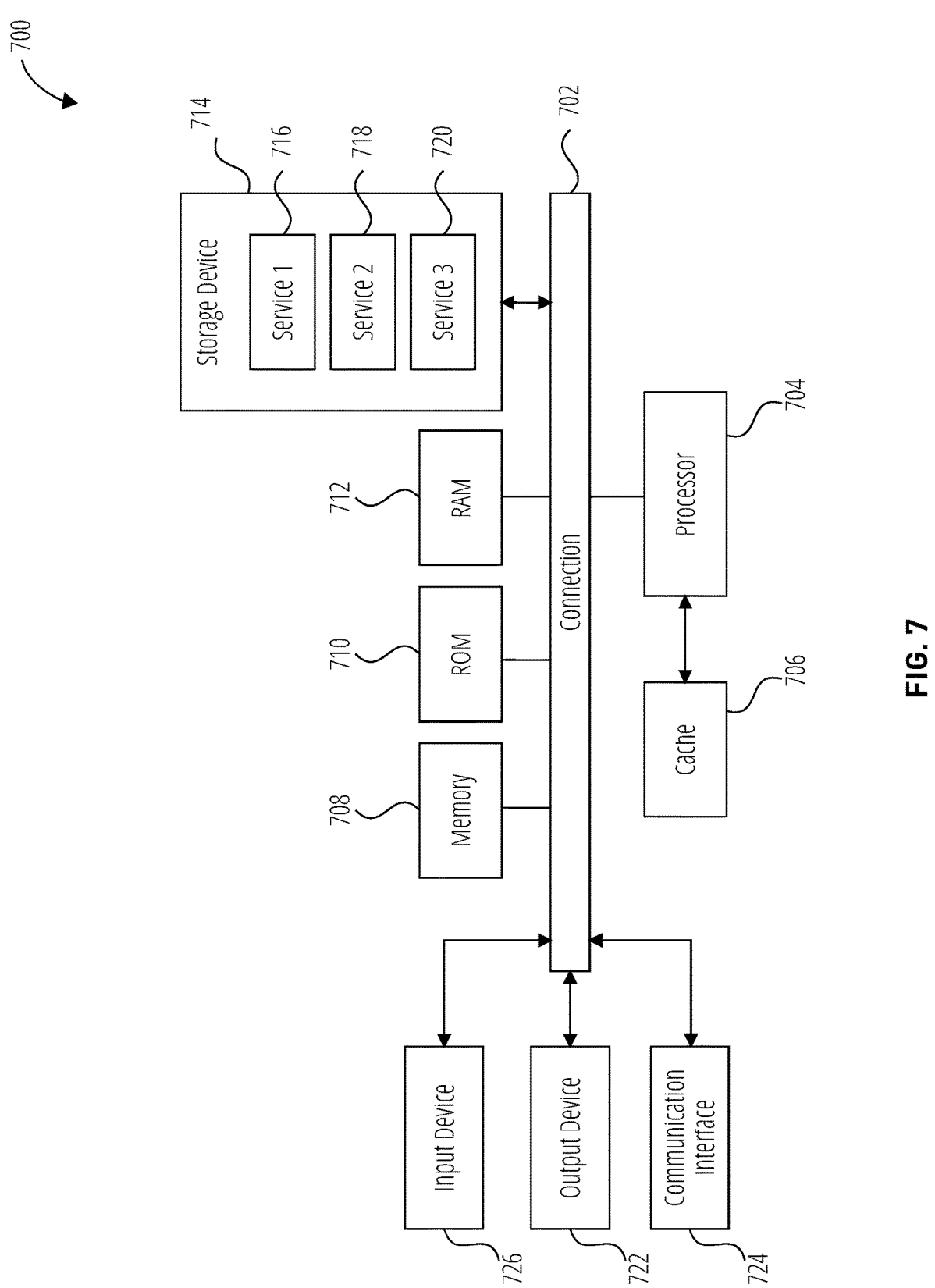
FIG. 7 illustrates an example of a computing system according to some aspects of the present technology.

FIG. 7 shows an example of computing system 700, which can be for example any computing device making up the system network 100 of FIG. 1, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (central processing unit (CPU) or processor) 704 and connection 702 that couples various system components including system memory 708, such as read-only memory (ROM) 710 and random-access memory (RAM) 712 to processor 704. Computing system 700 can include a cache of high-speed memory 706 connected directly with, in close proximity to, or integrated as part of processor 704.

Processor 704 can include any general-purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer. such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on. 5

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. 15

The instructions, media for conveying such instructions, computing resources for executing them, and other structures for supporting such computing resources are means for providing the functions described in these disclosures.

Clause 1. A method for requesting, by a network controller, an unscheduled radio resource management (RRM) operation, the method comprising: monitoring telemetry and wireless frequency restrictions for a portion of access points in a network, wherein configurations for the portion of the access points in the network are managed by the network controller; identifying a qualifying event, wherein the qualifying event is sufficient to trigger an unscheduled RRM operation on a portion of the access points in a network; and triggering an RRM request after the identification of the qualifying event.

Clause 2. The method of Clause 1, wherein the qualifying event is caused by a power failure, a system restart, or a radar event affecting a threshold amount of the access points.

Clause 3. The method of any of Clauses 1 to 2, wherein the threshold amount of the access points is a percentage of neighboring access points within a physical location.

Clause 4. The method of any of Clauses 1 to 3, wherein the qualifying event is caused by an update to an automated frequency coordination (AFC) system affecting frequency assignments for a threshold amount of the access points.

Clause 5. The method of any of Clauses 1 to 4, further comprising: triggering an RRM operation after receiving the RRM request, the RRM operation is effective to configure the portion of the access points impacted by the qualifying event to operate within the network with respective configurations designated by the network controller for the purpose of achieving at least one targeted key performance indicator (KPI) indicating acceptable network performance.

Clause 6. The method of any of Clauses 1 to 5, wherein the qualifying event affects the portion of the access points, and portion of the access points are a subset of access points in the network, the method comprising: triggering the RRM operation, wherein the RRM operation is limited to the portion of the access points affected by the qualifying event.

Clause 7. The method of any of Clauses 1 to 6, wherein the qualifying event is one in which at least one key performance indicator for the portion of the access points is below a threshold.

Clause 8. A network device comprising: one or more memories having computer-readable instructions stored therein; and one or more processors configured to execute the computer-readable instructions to: monitor telemetry and wireless frequency restrictions for a portion of access points in a network, wherein configurations for the portion of the access points in the network are managed by the network controller; identify a qualifying event, wherein the qualifying event is sufficient to trigger an unscheduled RRM operation on a portion of the access points in a network; and trigger an RRM request after the identification of the qualifying event.

Clause 9. The network device of Clause 8, wherein the qualifying event is caused by a power failure, a system restart, or a radar event affecting a threshold amount of the access points.

Clause 10. The network device of any of Clauses 8 to 9, wherein the threshold amount of the access points is a percentage of neighboring access points within a physical location.

Clause 11. The network device of any of Clauses 8 to 10, wherein the qualifying event is caused by an update to an automated frequency coordination (AFC) system affecting frequency assignments for a threshold amount of the access points.

Clause 12. The network device of any of Clauses 8 to 11, wherein the instructions further cause the processor to: trigger an RRM operation after receiving the RRM request, an RRM operation after receiving the RRM request, the RRM operation is effective to configure the portion of the access points impacted by the qualifying event to operate within the network with respective configurations designated by the network controller for the purpose of achieving at least one targeted key performance indicator (KPI) indicating acceptable network performance.

Clause 13. The network device of any of Clauses 8 to 12, wherein the qualifying event affects the portion of the access points, and portion of the access points are a subset of access points in the network, the method comprising: trigger the RRM operation, wherein the RRM operation is limited to the portion of the access points affected by the qualifying event.

Clause 14. The network device of any of Clauses 8 to 13, the qualifying event is one in which at least one key performance indicator for the portion of the access points is below a threshold.

Clause 15. A non-transitory computer-readable medium comprising computer-readable instructions, which when executed by one or more processors of a network appliance, cause the network appliance to: monitor telemetry and wireless frequency restrictions for a portion of access points in a network, wherein configurations for the portion of the access points in the network are managed by the network controller; identify a qualifying event, wherein the qualifying event is sufficient to trigger an unscheduled RRM operation on a portion of the access points in a network; and trigger an RRM request after the identification of the qualifying event.

Clause 16. The computer-readable medium of Clause 15, wherein the qualifying event is caused by a power failure, a system restart, or a radar event affecting a threshold amount of the access points.

Clause 17. The computer-readable medium of any of Clauses 15 to 16, wherein the threshold amount of the access points is a percentage of neighboring access points within a physical location.

Clause 18. The computer-readable medium of any of Clauses 15 to 17, wherein the qualifying event is caused by an update to an automated frequency coordination (AFC) system affecting frequency assignments for a threshold amount of the access points.

Clause 19. The computer-readable medium of any of Clauses 15 to 18, wherein the computer-readable medium further comprises instructions that, when executed by the network appliance, cause the network appliance to: trigger an RRM operation after receiving the RRM request, the RRM operation is effective to configure the portion of the access points impacted by the qualifying event to operate within the network with respective configurations designated by the network controller for the purpose of achieving at least one targeted key performance indicator (KPI) indicating acceptable network performance.

Clause 20. The computer-readable medium of any of Clauses 15 to 19, wherein the qualifying event affects the portion of the access points, and portion of the access points are a subset of access points in the network, the method comprising: trigger the RRM operation, wherein the RRM operation is limited to the portion of the access points affected by the qualifying event.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for requesting, by a network controller, an unscheduled radio resource management (RRM) operation, the method comprising:

monitoring telemetry and wireless frequency restrictions for a portion of access points in a network, wherein configurations for the portion of the access points in the network are managed by the network controller, the management by the network controller based on RRM optimizations derived from continuous learning by an Artificial Intelligence (AI) Core using data from the network and additional wireless networks;

identifying a qualifying event, wherein the qualifying event is sufficient to trigger an unscheduled RRM operation on the portion of the access points in the network, wherein the unscheduled RRM operation being further optimized by said continuous learning by the AI Core; and triggering an RRM request after an identification of the qualifying event, wherein the RRM request being processed by the AI Core to determine RRM configurations, and the RRM configurations being implemented to perform the unscheduled RRM operation to configure the portion of the access points in the network impacted by the qualifying event.

2. The method of claim 1, wherein the qualifying event is caused by a power failure, a system restart, or a radar event affecting a threshold amount of the access points.

3. The method of claim 2, wherein the threshold amount of the access points is a percentage of neighboring access points within a physical location.

4. The method of claim 1, wherein the qualifying event is caused by an update to an automated frequency coordination (AFC) system affecting frequency assignments for a threshold amount of the access points.

5. The method of claim 1, further comprising:

triggering an RRM operation after receiving the RRM request, the RRM operation is effective to re-configure the portion of the access points impacted by the qualifying event to operate within the network with respective configurations designated by the network controller for a purpose of achieving at least one targeted key performance indicator (KPI) indicating acceptable network performance.

6. The method of claim 1, wherein the qualifying event affects the portion of the access points, and the portion of the access points are a subset of access points in the network, the method comprising:

triggering the RRM operation, wherein the RRM operation is limited to the portion of the access points affected by the qualifying event.

7. The method of claim 1, wherein the qualifying event is one in which at least one key performance indicator for the portion of the access points is below a threshold.

8. A network device comprising:

one or more memories having computer-readable instructions stored therein; and one or more processors configured to execute the computer-readable instructions to:

monitor telemetry and wireless frequency restrictions for a portion of access points in a network, wherein configurations for the portion of the access points in the network are managed by a network controller, the management by the network controller based on RRM optimizations derived from continuous learning by an Artificial Intelligence (AI) Core using data from the network and additional wireless networks;

identify a qualifying event, wherein the qualifying event is sufficient to trigger an unscheduled RRM operation on the portion of the access points in the network, wherein the unscheduled RRM operation being further optimized by said continuous learning by the AI Core; and trigger an RRM request after an identification of the qualifying event, wherein the RRM request being processed by the AI Core to determine RRM configurations, and the RRM configurations being implemented to perform the unscheduled RRM operation to configure the portion of the access points in the network impacted by the qualifying event.

9. The network device of claim 8, wherein the qualifying event is caused by a power failure, a system restart, or a radar event affecting a threshold amount of the access points.

10. The network device of claim 9, wherein the threshold amount of the access points is a percentage of neighboring access points within a physical location.

11. The network device of claim 8, wherein the qualifying event is caused by an update to an automated frequency coordination (AFC) system affecting frequency assignments for a threshold amount of the access points.

12. The network device of claim 8, wherein the instructions further cause the one or more processors to:

trigger an RRM operation after receiving the RRM request, the RRM operation after receiving the RRM request, the RRM operation is effective to configure the portion of the access points impacted by the qualifying event to operate within the network with respective configurations designated by the network controller for a purpose of achieving at least one targeted key performance indicator (KPI) indicating acceptable network performance.

13. The network device of claim 8, wherein the instructions further cause the one or more processors to:

trigger an RRM operation after receiving the RRM request, the RRM operation after receiving the RRM request, the RRM operation is effective to configure the portion of the access points impacted by the qualifying event to operate within the network with respective configurations designated by the network controller for a purpose of achieving at least one targeted key performance indicator (KPI) indicating acceptable network performance.

14. The network device of claim 8, wherein the qualifying event is one in which at least one key performance indicator for the portion of the access points is below a threshold.

15. A non-transitory computer-readable medium comprising computer-readable instructions, which when executed by one or more processors of a network appliance, cause the network appliance to:

monitor telemetry and wireless frequency restrictions for a portion of access points in a network, wherein configurations for the portion of the access points in the network are managed by a network controller, the management by the network controller based on RRM optimizations derived from continuous learning by an Artificial Intelligence (AI) Core using data from the network and additional wireless networks;

identify a qualifying event, wherein the qualifying event is sufficient to trigger an unscheduled RRM operation on the portion of the access points in the network, wherein the unscheduled RRM operation being further optimized by said continuous learning by the AI Core; and trigger an RRM request after an identification of the qualifying event, wherein the RRM request being processed by the AI Core to determine RRM configurations, and the RRM configurations being implemented to perform the unscheduled RRM operation to configure the portion of the access points in the network impacted by the qualifying event.

16. The non-transitory computer-readable medium of claim 15, wherein the qualifying event is caused by a power failure, a system restart, or a radar event affecting a threshold amount of the access points.

17. The non-transitory computer-readable medium of claim 16, wherein the threshold amount of the access points is a percentage of neighboring access points within a physical location.

18. The non-transitory computer-readable medium of claim 15, wherein the qualifying event is caused by an update to an automated frequency coordination (AFC) system affecting frequency assignments for a threshold amount of the access points.

19. The non-transitory computer-readable medium of claim 15, wherein the computer-readable medium further comprises instructions that, when executed by the network appliance, cause the network appliance to:

trigger an RRM operation after receiving the RRM request, the RRM operation is effective to configure the portion of the access points impacted by the qualifying event to operate within the network with respective configurations designated by the network controller for a purpose of achieving at least one targeted key performance indicator (KPI) indicating acceptable network performance.

20. The non-transitory computer-readable medium of claim 15, wherein the computer-readable medium further comprises instructions that, when executed by the network appliance, cause the network appliance to:

trigger an RRM operation, wherein the RRM operation is limited to the portion of the access points affected by the qualifying event.

* * * * *